United States Patent [19]

De Witt et al.

[11] 3,749,480

[45] July 31, 1973

[54] MIRROR ROTATION CORRECTION SYSTEM

[76] Inventors: Ralph W. De Witt, 68 Spring Ave., Latham, N.Y.; David A. De Witt, 9 Wempel Building Netherlands Village, Schenectady, N.Y. 12308

[22] Filed: Aug. 19, 1971

[21] Appl. No.: 173,139

[52] U.S. Cl. .............................................. 350/289
[51] Int. Cl. ............................................ G02b 5/08
[58] Field of Search................... 350/289, 307, 303, 350/304

[56] References Cited
UNITED STATES PATENTS

| | | | |
|---|---|---|---|
| 3,166,630 | 1/1965 | Esslinger | 350/307 |
| 3,469,901 | 9/1969 | Cook et al. | 350/289 |
| 3,390,937 | 7/1968 | Nicholson | 350/289 |

*Primary Examiner*—David Schonberg
*Assistant Examiner*—Michael J. Tokar
*Attorney*—Charles W. Helzer

[57] ABSTRACT

A rear view mirror rotation system compensating for the relative movement of a tractor-trailer combination having a mechanical sensing device adjacent the "fifth wheel." The relative mechanical rotation is converted to an analog electrical signal for rotating the appropriate rear view mirror so that the driver can maintain a line of vision to the rear wheels of the trailer. Hook-up and initial alignment of the system is quite simple requiring only the attachment of a sensor and certain adjustments to the electrical circuitry that can be made by the driver of a rig from within the cab of the tractor. No substantial modification or adaptation of the trailer is required other than to provide a simple retainer or fastener for the sensor. Thus, a tractor equipped with the system can be used universally with any trailer.

16 Claims, 5 Drawing Figures

PATENTED JUL 31 1973 3,749,480

INVENTORS
DAVID A. DEWITT
RALPH W. DEWITT

BY Charles W. Helgen
ATTORNEY

MIRROR ROTATION CORRECTION SYSTEM

BACKGROUND OF THE PRIOR ART

The invention relates generally to the positioning of rear view mirrors on the tractor of tractor-trailer rigs of the type utilizing a "fifth wheel" for connecting the trailer to the tractor. More particularly, the invention as discussed relates to a means for automatically rotating either the right or left rear view mirrors relative to the right or left rear wheels as the tractor turns relative to the trailer.

It is common practice to position the right rear view mirror, which is mounted exterior of the cab, so that as the driver looks out the right window, his line of reflected sight is directed toward the right rear wheel. It is obvious, however, that when the tractor and trailer are not aligned on a common central axis, i.e. when the tractor is turned relative to the trailer, this direct line of sight is lost. Since most mirrors are constructed of a width of about 4 to 6 inches, the driver should be able to view an area which includes an area slightly forward of the rear wheel and slightly to the rear thereof. The purpose, of course, is for him to have a fairly wide view of vehicles traveling behind him. This situation is also true of the left mirror, but for simplicity only the right mirror is discussed.

When the driver negotiates, for example, a right turn of 45°, his line of sight is now reflected off of the mirror to a point well forward of the rear wheel. For a 45° turn, this point of reflection is very near the front of the trailer. For the driver to see the rear wheel, or to see in the vicinity of the rear wheel, it would be necessary to rotate the mirror in a counter-clockwise direction.

It will be appreciated that there are a considerable number of times when it is important for the driver to have a view of the rear of his vehicle. A first such instance is when he is backing into a loading or unloading area such as a dock. At this time the tractor is almost always at some angle relative to the trailer to facilitate the docking maneuver. The backing maneuver must be fairly accurate, both in the distance from the dock and the lateral position of the truck adjacent to the material to be loaded or a particular door in a warehouse. This means that at any angle of the tractor to the trailer, the driver should be able to see the rear of his trailer quite well so that he may properly position it within the specific location. Since the rear view mirrors on tractors are normally stationary, it is necessary for the driver to quite often leave his vehicle or get additional assistance to perform the parking maneuver. In many cases when assistance is not available and it is too dangerous or impractical for the driver to leave the vehicle, the docking procedure requires several attempts. More serious is the fact that this maneuvering often results in damage to the vehicle or the dock. It will be appreciated that the docking procedure is one of the most difficult for the beginning driver to learn. It takes considerable time for the driver to obtain the necessary "feel" for his location relative to the dock when it is not in his line of sight. Also, this "feel" will change from one tractor-trailer to another.

A second instance which requires the maintenance of rearward vision is when the tractor-trailer must negotiate a turn on a narrow street or other confined area due to parked cars or traffic. When a tractor-trailer turns a corner too sharply, the rear trailer wheels will often pass over the street curb. This results from the fact that the rearward vision is blocked due to the inability of the driver to see the rear wheels. The passing of the rear wheels over the curb is dangerous for a number of reasons. First of all, in the most serious case, a pedestrian could be struck and injured, or at least forced to move back from the edge of the curb in fear of being struck by the trailer. Secondly, assuming a two or four wheel cluster and only one wheel passing over the edge of the curb, the other wheels are off the roadway. Therefore, all of the weight of that corner of the trailer is supported on one wheel. This can result in a piercing action by the edge of the curb against the tire, causing failure. A single tire failure, if gone undetected, can result in a serious condition for the vehicle, as well as costly road service repairs.

If the vehicle is carrying fragile or delicate loads which are tipped at angles not anticipated by the shipper, there can be serious cargo damage due to upsetting or dislodging. If the driver were able to see the rear wheels in these instances, he could have easily ascertained the imminent danger and taken corrective action, thus preventing the damage.

A number of prior art devices have been proposed to alleviate the problem by providing means to rotate the rear view mirrors. A considerable number of attempts have been made to provide either mechanical or electrical means, or a combination of the two to rotate the rear view mirror remotely from inside the vehicle.

There also have been several such approaches to automatically adjust the rear view mirror; however, none of these have been successful and/or have serious shortcomings. One such approach illustrated in U.S. Pat. No. 2,854,892 provides a rear view mirror assembly for a tractor-trailer wherein the adjustment of the mirror is accomplished by a linkage to the wheels. This device has a number of disadvantages in that it is difficult to attach and adjust, as well as the fact that its accessability is not good. Further, it is not necessarily desirable to have the rear view mirror turn each time the wheel turns since the desire is to have the device function relative to the trailer and not just one wheel of the tractor.

Another approach illustrated in U.S. Pat. No. 2,988,957 has a rear view mirror adjustment which operates off of the steering column. This device has all of the shortcomings of the previously discussed reference since it operates on the turning of the wheels alone and has no relation to a towed vehicle.

A further prior art device, U.S. Pat. No. 3,469,901, has a plurality of switch contacts located adjacent the "fifth wheel" for operating a corresponding coil in a three coil relay. Energization of each coil progressively rotates the rear view mirror a given number of degrees. A disadvantage of the disclosure lies in the fact that it requires each trailer to be specially modified to provide contacts mounted on the underside thereof to cooperate with contacts adjacent the "fifth wheel," thereby making attachment and maintenance difficult and restricts use of the device only to those trailers which are so modified.

SUMMARY AND OBJECTS OF THE INVENTION

It is a primary object of the invention to provide a mirror rotation system which is easy to install and maintain and which will be acceptable to both the industry and the drivers themselves by providing tractor-trailers with a device which will make driving safer and easier.

Another object of the invention is to provide such a system which can be easily hooked-up by the driver initially and then automatically adjusted by the driver while in the cab to compensate for wide variations in the location of the rear wheels on different trailers.

Another object of the invention is to provide such a system that accommodates a tractor which has been rotated relative to the trailer upto an angle of 90°. While it is often necessary in positioning a trailer relative to a loading dock to have the tractor turned as far as possible relative to the trailer, upon the tractor being turned to an angle of 90° relative to the trailer, the driver generally can look out directly and see where he is maneuvering.

An additional object is to provide a rotatable mirror system which is compatible with the type of tractor-trailer combination currently in use, as well as any combination of towing and towed vehicles.

Another object is to provide such a system which is attached in such a way as not to interfere with the opening and closing of the vehicle doors, as well as one which is still operational when the vehicle door is opened or left opened.

Another object is to provide a mirror rotation system which will in no way interfere with any of the devices or assemblies on the tractor or trailer during normal maneuvering operations. The device is designed so as not to interfere with roof mounted air conditioning units, exhaust stacks, oil cooler stacks or the like.

Another object is to provide a device which can be easily disconnected when the tractor and trailer are disconnected and can tolerate frequent disconnecting operations whether or not it has regular provisions for attaching the safety device thereto.

Another object is to provide a device which when subjected to various climate and weather conditions, will not become damaged or fouled easily by snow, ice or the like.

Another object of the invention is the provision of manual and automatic means for disabling the system in the event of an unexpected failure due to a vehicle accident or excessive vandalism, as well as the normal, unpredictable failure of a component in the device.

An advantage of the invention is its capability of withstanding vertical movements of the tractor relative to the trailer without causing errors in the system.

Another object is to provide a device wherein the mirrors on the left and the right side can be appropriately rotated a different number of degrees in view of the fact that the driver obviously sits to the left side of the vehicle and his line of sight is different for the left and right mirrors.

Another object of the invention is to provide a device which is mounted in such a position that it can be seen through the front windshield, as opposed to being viewed out of the right hand window. Therefore, the driver will not be required to turn his general line of sight away from the oncoming traffic.

A further object is to provide a mirror rotation means that utilizes an analog signal whereby a continuous linear adjustment of the rear view mirrors may be attained as opposed to an incremental, stepped adjustment.

While the discussion herein relates to tractor-trailer operations, the invention can be used with tractor-trailers not employing a "fifth wheel" connection and with smaller trucks or automobiles pulling house trailers or the like. However, since the principal application is with respect to tractor-trailer rigs, the description will be concerned primarily with such rigs using a "fifth wheel."

Since the amount of rotation needed to maintain vision of the rear wheel area is dependent upon the distance from the center line of the mirror to the center line of the "fifth wheel" connection, it is proposed that the right rear view mirror be placed in a position as forward as possible on the tractor. It is also proposed to provide a device which can be rotated to compensate for the variations in distances between the driver and the rear wheel in the different configurations of tractors and trailers.

The invention provides for adjusting the rear view mirrors of the tractor in relation to the trailer movement by having an elastic strap connected from a rotating shaft adjacent the "fifth wheel" to a point on the trailer which is also on a center line with the king pin. As the tractor and trailer turn relative to each other, the shaft turns. Through a gear train arrangement, a switch is actuated to initiate control of either the right or left rear view mirror. A motor, through another appropriate set of gear trains, rotates the mirror a given number of degrees in accordance with the output of a feedback operational amplifier-power amplifier combination. The output of the amplifier is a function, among the other things, of the output of a feedback potentiometer controlled by a sensor shaft positioned to sense relative rotation of the "fifth wheel."

BRIEF DESCRIPTION OF THE DRAWINGS

The above and other objects and advantages of the invention will become apparent from the following description, together with the drawings wherein.

DETAILED DESCRIPTION OF THE INVENTION

MECHANICAL SYSTEM

For ease in explanation, only one rear view mirror, namely the right hand rear view mirror is illustrated. However, it is believed apparent that the same type of mechanism is connected to the left hand rear view mirror as will be pointed out at specific points throughout the following discussion.

Figure 1:
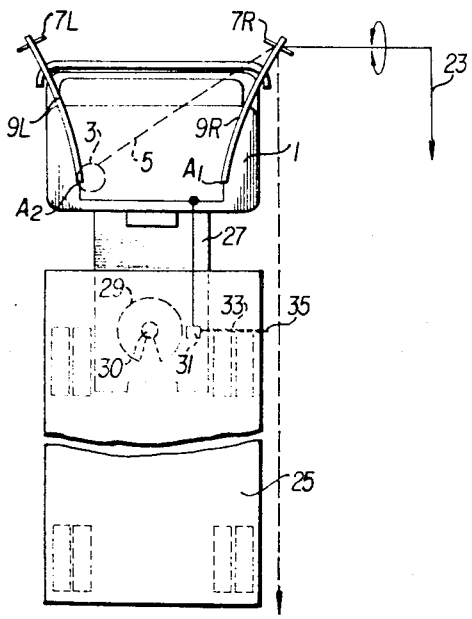
FIG. 1 is a schematic view of a tractor-trailer attachment including a "fifth wheel" and both right hand and left hand rear view mirror rotation systems.

Referring now to FIG. 1, a tractor is seen schematically at 1 with a driver positioned at 3. A dotted line 5 represents a line of sight from the driver through the front windshield to a rotating rear view mirror 7R positioned on a sealed mounting tube 9R. The tube 9R is attached to the roof of the tractor cab by suitable and adjustable attaching means. Located within the sealed tube and suitably connected to the rotating mirror is the right mirror rotation system including a DC servo motor 11 (or equivalent drive motor) with a gear train 13 connected thereto. The gear train, also shown in FIG. 4, has an output shaft 15 and is connected to drive the rotatable arm of a feedback potentiometer 17, and a second gear train 19 that drives mirror 7R through a detent clutch safety overload 21. The rotating mirror 7R is connected mechanically to the output from the detent overload clutch 21 through a suitable known gear and rack assembly (not shown) for rotating mirror 7R as represented by line 23 between FIGS. 1 and 4. The electrical connections to the motor 11 which will be discussed below, are carried within the tube 9R and enter the cab via a suitable sealed opening in the roof of the cab. The entire structure within the mounting tube is sealed so as to protect the device from adverse atmospheric conditions. A similar tube 9L is provided along with a left mirror rotation system for rotating the left mirror 7L.

Figure 2:
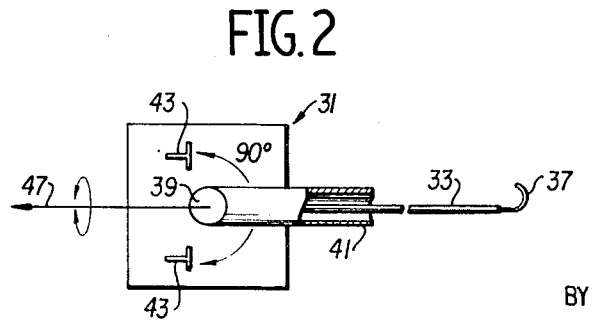
FIG. 2 is a schematic representation of the control box of FIG. 1 with the aligning tube and strap.

A trailer 25 is attached to the tractor 1 by means of a usual connecting member 27 supporting a "fifth wheel" and king pin 30. Positioned adjacent the "fifth wheel" 29, along its center line, is a control box 31 for sensing relative rotation between the tractor and trailer. A flexible elastic member 33 such as an elastomer rubber extension strap extends from the control box to a point 35 on the trailer, along the center line of the "fifth wheel" king pin 30, and perpendicular to the axis of the two vehicles. As seen in FIG. 2, a hook 37 or other suitable fastening means, is used to make the connection temporarily to the towed vehicle at the point 35. Obviously, there would be an eye or other suitable fastening into which the hook is positioned. While a hook is shown, obviously any readily attachable means of connection such as a holding magnet for use with metal trailers, or the like, could be used and which can reaily and easily be attached and detached to trailer 25 with a minimum of effort on the part of the operator.

The control box 31 includes a vertically extending sealed shaft 39 which is freely rotatable therein. An aligning tube 41 which encloses elastic member 33, extends for a distance outwardly from the shaft 39. As will be apparent from FIG. 2, the tube 41 extends only a short distance from the shaft 39. A plurality of stops 43 are positioned on either side of the shaft 39. The purpose of the stops is to limit the rotation of shaft 39 and aligning tube 41 to 90° on either side of the center line.

Upon rotation of the tractor relative to the trailer about the king pin 30, the strap 33, being free to expand, maintains a straight line of connection between the shaft 39 of the rotary control box 31 and the attaching point 35 on the side of the trailer. In so doing, the strap 33 causes relative rotation of the aligning tube 41 with respect to box 31 (and hence tractor 1 on which it is mounted) which results in the rotation of the shaft 39. This rotation is representative of the relative rotation between the tractor and trailer, and is transmitted through a sealed bearing cartridge providing access to the inside of the weather-tight box 31 to a gear train 45 having a 1:2 ratio. This connection is illustrated by the line 47 connecting FIGS. 2 to 3.

Figure 3:
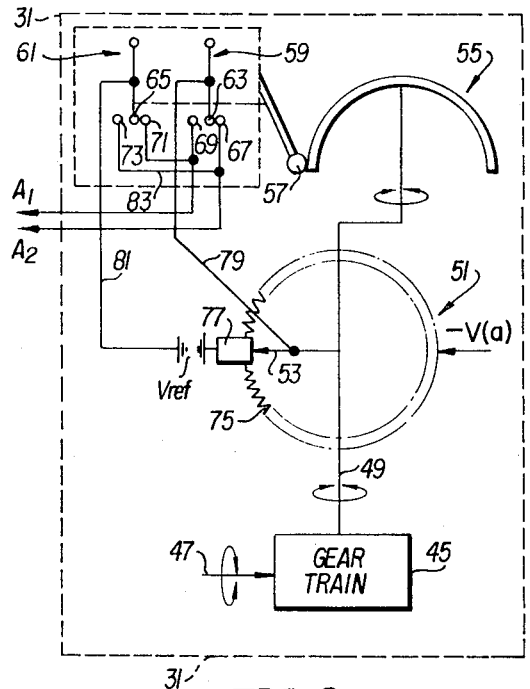
FIG. 3 is a schematic diagram of the components of the system positioned within a control box mounted on the tractor adjacent the "fifth wheel."

Since the device 31 includes the pair of stops 43, the input to the gear train 45 will be only ± 90°. With a 1:2 gear ratio the resultant output from gear train 45 is an output rotation of ± 180°. This output rotation is applied to the movable contact arm 53 of an input potentiometer 51 also mounted within the weather-tight enclosure 31 and shown in FIG. 3. If it were desired to increase sensitivity by utilizing a potentiometer having a higher number of turns, the 1:2 ratio of gear train 45 could be altered accordingly. However, for simplicity and cost saving purposes, the single turn potentiometer 51 is used. Also attached to the output shaft 49 is a cam assembly 55 having a cam follower 57 that actuates a selector switch assembly 59 for selecting either the right or left mirror for rotation. All of the devices shown in FIG. 3 are physically enclosed within the weather-tight enclosure of control box 31 of FIG. 2. If desired, however, the elements in FIG. 3 may be located remote from the control box area 31 by means of standard flexible shafting means designed to transmit the appropriate rotary motion. The remote location may be desirable because of vibration or lack of space in the area of the "fifth wheel." It is intended, however, that the control box 31 be mounted on the tractor and positioned to sense either directly or remotely relative rotation of the "fifth wheel" and the trailer without requiring any modification to the trailer other than the aforementioned hooking of the elastomer strap 33.

The positioning of the rotary devices in FIG. 2 at the "fifth wheel" or other hinging point centerline is quite desirable in order to prevent relative vertical motion between the two vehicles from causing an erroneous rotation of the shaft 39. Since the centerline is on the hinging axis, and common to both the tractor and the trailer, it will have no relative vertical motion between the two vehicles, only a common vertical movement. Therefore, there are no erroneous signals being sent due to the vibration or vertical movement. Also, the rotation of shaft 39 will reflect, within an acceptable tolerance, the actual angular rotation of the two vehicles. As will be seen below, this information will be converted into analogous electrical analog signals.

The ± 90° rotation limit imposed by stops 43 is utilized for simplicity and no way limits the functioning or reliability of the system. Once the driver has rotated the cab to a point more than 90° to one side or the other, he will have an unhindered direct line of sight to the rear wheel by viewing out of the appropriate side window. While the system has been designed from a cost standpoint to only operate to ± 90°, the invention is in no way limited to that specific angle. By adding additional circuitry which would be obvious to one skilled in the art in the light of the present teaching, an output can be obtained commensurate with a relative tractor-trailer rotation of greater than ± 90°.

As discussed above, the mirror has been placed in front of its usual position on the vehicle so that the driver can easily view it directly through the windshield, thereby requiring only a minimum deviation of his line of sight from the oncoming traffic in order to see what is in back of him.

As will be further discussed below, after making the initial hook-up, it is possible to adjust the mirror from the driver's seat within the cab while either standing still or while in motion, as opposed to prior devices which require the driver to leave the vehicle. The elastomer strap 33 is capable of extension beyond its anticipated use up to a limit at which point it will eventually fracture. This type of elastomer device is provided so that if the driver should fail to connect the tractor-trailer properly, or to disconnect the system upon separation of the tractor and the trailer, no damage will be done to the device. The strap is a relatively inexpensive component and can be replaced easily if it is broken in this manner. However, where a driver fails to connect the tractor-trailer properly, only a few inches of movement are needed to reveal this fact to him, and the elastomer will accommodate such small relative amount of movement between the tractor and the trailer.

ELECTRICAL SYSTEM

Referring now to FIG. 3, the mechanical rotation input from the rotating shaft 47 entering the gear train 45 has a 1:2 input-output relationship whereby a 90° input rotation will provide a 180° output rotation on shaft 49 which is mechanically connected to the input potentiometer slider 53 and the cam assembly 55. The cam 55 cooperates with a cam follower 57 which mechanically actuates a pair of switches 59 and 61 having movable contacts 63 and 65, respectively. Contact 63 cooperates with a pair of stationary contacts 67 and 69; while movable contact 65 cooperates with a pair of stationary contacts 71 and 73.

The potentiometer 51 has a resistance element 75 which is approximately 350° in circumference and includes a small "dead band" area of about 10° as seen at 77. It will be appreciated that as the output shaft 49 rotates from its center position ± 5°, there will be no contact with the resistor. The resistance 75 is connected to a source of reference potential at $V_{ref}$ adjacent the "dead band" point and a negative potential source $-V_a$ 180° therefrom. Slider 53 is electrically connected to the movable contact 63 by means of a line 79, while movable contact 65 is connected via a line 81 to the reference potential $V_{ref}$. As will be discussed below, the output from switch 59 is connected via a line A1 to the right-hand mirror operating circuitry; while an output A2 is connected to the left-hand mirror operating circuitry. The left-hand mirror and operation thereof is not discussed herein, but is similar to that for operating the right-hand rear view mirror.

As shaft 49 rotates to the right, it causes a clockwise rotation of the slider 53 and cam 55. Therefore, the switch 59 connects slider 53 electrically to the right-hand mirror output A1 via line 79 and contacts 63 and 69. The left-hand rear view mirror operating circuit operates similarly via line A2 which is connected to ground ($V_{ref}$) through line 83, contacts 65 and 73, and line 81. As the slider 53 simultaneously rotates with the cam 55, it varies the resistance connected to a potential $-V_a$. Therefore, for an increasing clockwise rotation of the output shaft, the output A1 will become more negative. For a maximum 180° clockwise travel, the full $-V_a$ potential will be applied to the slider 53 and hence the output A1. The A2 output operates in a similar manner.

The "dead band" region of approximately ± 5° on each side of dead center is provided on the potentiometer 51 for holding the output at the potential of $V_{ref}$ to prevent continual system chatter within this region. This chatter could occur when the vehicle is traveling along the highway with slight relative movement between the tractor and trailer. It will be appreciated that there is almost always some relative movement due to swaying, etc., between the tractor and trailer which, without the "dead band" area, would cause continual rapid actuation of the device. Continual chatter in the system could lead to early failure and introduce fatigue problems in some of the mechanical components. Further, the cam can be provided with such a slope as to prevent actuation of the switch or any movement in the switch arm before an additional 5° rotation from the center has occured.

Figure 5:
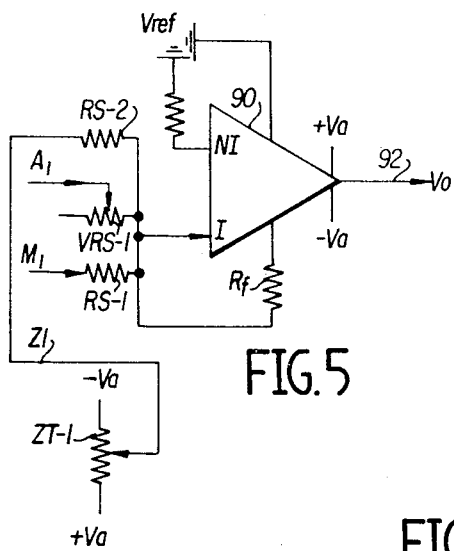
FIG. 5 is a schematic diagram of the circuitry connecting the elements in FIG. 3 with those in FIG. 4.

Referring now to FIG. 5, a commercially available, frequency compensated, operational amplifier-power amplifier combination 90 of conventional construction, is illustrated. This device includes a set of high integrity, integrated circuits employing suitable "slew rate" frequency compensation on the gain and providing for ample power gain to drive the reversable servo motor 11 via a conductor 92 seen connecting FIGS. 5 and 4. To an inverting input I of the amplifier 90 is connected a feedback resistor Rf that in turn is connected to a variable input scaling resistor VRS-1 through which the input A1 from input potentiometer 51 is fed from FIG. 3 and a fixed input scaling resistor RS-1. Variable scaling resistor VRS-1 provides a means for varying the value (gain) of the input A1 relative to the value of the feedback signal M1. Signal M1 feeds into the resistance RS-1 from a slider 94 on feedback potentiometer 17 in FIG. 4. Also connected into the inverting input line is a fixed scaling resistor RS-2 that is supplied from a variable voltage supply ZT-1 which is used for zero-point adjustment of the voltage coming into the inverting input via line Z1. By varying the relative values of A1 and M1, compensation is provided for variances in the different vehicles being towed, or any other variance requiring adjustment for any point in the mirror travel, not just at the zero point where ZT-1 provides initial compensation.

Since the output voltage of the amplifier 90 is related to the input as follows:

$$Vo = -K \, [(Rf/RS-1) \cdot M1 + (Rf/RS-2) \cdot Z1 + (Rf/VRS-1) \cdot A1]$$

EQ-1 where $K$ equals the amplifier voltage gain, then it can be seen that the ratio of the respective scaling resistor $VRS-1$ to the feedback resistor $Rf$ determines the amount of voltage input ($Z1$, $A1$, $M1$) contributing to the output voltage. Since all voltages are defined relative to the reference voltage $V_{ref}$, then $V_{ref}$ is that voltage half-way between $+V_a$ and $-V_a$. If $ZT-1$ is set at the midpoint, then the voltage $Z1$ will add a fixed amount to the output signal, that being:

$$-K \cdot (Rf/RS-1)(\pm Z1)$$

EQ-2

When the tractor and trailer are in a straight line position, the input voltage A1 from the potentiometer 51 should be equal to $V_{ref}$, if the elastomer strap 33 has been connected properly. However, this $V_{ref}$ value for A1 may not be true for all trailers. If A1 has a slight negative voltage, then by adjusting $ZT-1$, a positive bias voltage Z1 can be added to compensate for this non-zero, negative value of A1. Therefore, this is why the potentiometer $ZT-1$ is referred to as a zero point adjustment. Since the inverted input I to the amplifier acts as a summing junction for the voltages as shown by the equation EQ-1, then it will be desirous to have the system wired to the motor in such a way as to cause the unbalanced input voltage:

$$Vun = A1 \pm Z1$$

EQ-3 to result in a rotation of the motor and thus rotation of the potentiometer 17 to generate an increasingly positive voltage $M1$ to be added and compensate for the unbalanced voltage $Vun$. Since the output voltage $Vo$ equals $-Vun$, then a negative voltage will result in a positive output; and since the negative input voltage is caused by a clockwise rotation of the vehicle (a right turn for which a compensating counterclockwise turn of the mirror is required to maintain a proper line of sight), then the transfer function of the motor should be $-Vin$ negative results in a counterclockwise rotation of the potentiometer 17 or a positive $M1$.

It can be seen then that the device causes rotation of the mirror in a direction to compensate for the rotation of the vehicle. Also, the sensitivity or amount of rotation of the mirror for an equivalent rotation of the vehicle can be varied by varying the setting of the scaling resistor $VRS-1$ to vary the gain of that component of the output voltage $Vo$ represented by $A1$. This then provides for an effective variable gear ratio of gear train 13. The reason for this remotely variable sensitivity is to compensate for various mirror mounting positions relative to the driver and for varying lengths of towed vehicles.

Figure 4:
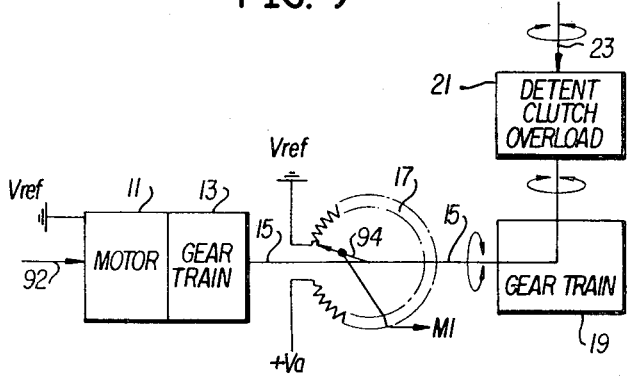
FIG. 4 is a schematic diagram of the components of the system which are connected to and drive the rear view mirror, and are supported within mounting tubes on the tractor which also support the rear view mirror in a rotatable manner.

It will further be appreciated that a similar circuit to that shown in FIGS. 4 and 5 is provided for the left-hand mirror on the vehicle for which compensation is desired. Each is provided with its own separate remote zero and sensitivity adjustments. It can also be seen that the zero adjustment can be used to check the operation of the device since it can be used to simulate the signal provided by potentiometer 51, or in effect, simulate a turning situation. It can also be used to scan remotely the entire field of view of the mirror, which is approximately ± 45°.

The motor 11 includes a commercially available slip-clutch to prevent it from burning out if the mirror assembly or other components become jammed. The rotation of motor 11 and its associated gear train 13 will rotate the potentiometer slider 94. Gear train 19 is used to reduce the effective rotation of the potentiometer 17 to one tenth of the rotation required to turn the mirror through its full travel. This tends to increase the precision of the mirror rotation as it will require ten turns of the potentiometer to cause the full correction of the mirror. Gear train 19 is connected to the mirror rotation shaft through a detent clutch overload 21. This clutch will allow the mirror to be rotated either under excessive manual torque or in the case of accidental striking of the mirror by a fixed object without causing serious damage to the gear train drive. To return the mirror to its defined system position, a manually exerted rotation on the mirror will be required until the detent type clutch is again engaged. Gear train 19 also provides for additional torque amplification.

While the instant invention has been disclosed in some detail relative to an analog device, it will be appreciated that a digital electrical system utilizing similar principles could be employed in place of the analog system. Further, while the analog system disclosed is fully linear in nature, it is also possible to employ analog feedback system of a non-linear, intermittent form which are known as "on-off" or "bang-bang" type controls. Such a system would probably make corrections of a less precise nature and not provide for as many adjustments; however, if a wider viewing angle mirror were employed, it might be satisfactory. One form of this type of system could utilize a current (or voltage) sensitive polarity detecting relay in the feedback loop as opposed to the operational amplifier type of linear feedback herein disclosed. With such a system the mirror drive motors would be either full-on or full-off in making incremental corrections called for by the sensors.

The aligning tube 41 on the rotary device may be lightly spring-loaded so that when the tractor is traveling without a trailer, the tube will stay in its center position. Therefore, the mirror will be in its relaxed, normal position. Another approach to obtain the same result would be to provide a switch on the cab or tractor which would have an automatic and a manual setting. In the automatic setting the system would function normally; however, in the manual setting the voltages $A1$ and $A2$ would both be connected to a $Vref$. Therefore, the mirrors would have to go to the normal position to supply the compensating inputs to $A1$ and $A2$ at the amplifier inputs. This would mean that the potentiometer on the tractor could go to any value, and it would be ignored by the rest of the system.

It will be seen in operation that as the tractor rotates relative to the trailer the strap 33 will act upon the aligning tube 41 to rotate the shaft 39. The rotation of shaft 39 seen in FIGS. 1 and 2 causes the rotation of gear train 45 through line 47. The rotation of the cam 55 connects either the left mirror or the right mirror via voltages $A2$ and $A1$ respectively to the system. The variation in the voltage as a percent of $-Va$ is fed through line 79 to, for example, line $A1$. This voltage is fed into the operational amplifier 90. Also fed into the amplifier 90 is $M1$ and $Z1$. As the motor 11 is turned due to the output 92, the output from the potentiometer 17 will increase as a percent of $+Va$. When the motor has turned the output shaft 15 to a point such that:

$$A1 + M1 + Z1 = 0$$

EQ-4 the motor will stop. At this time the mirror will be at the proper position for the instant relative location. This movement will be repeated in both directions each time that relative rotation of the tractor and trailer occurs. However, if the relative rotation occurs at the starting point, it must exceed ± 5°.

While the invention has been described with reference to a preferred system, it will be understood that it is capable of further modifications and this application is intended to cover any variations, uses or adaptations of the invention following in general the principles of the invention and including such departures from the present disclosure as come within known or customary practice in the art to which the invention pertains, and as may be applied to the essential features hereinbefore set forth and as fall within the scope of the invention or the limits of the appended claims.

What is claimed:

1. A device for automatically rotating a rear view mirror on a towing vehicle in relation to the relative rotational movement of a towed vehicle comprising:

a. electrically operated motor means for rotating a rear view mirror;

b. sensing means mounted on the towing vehicle and including a readily attached sensor element operatively engaging the towed vehicle for sensing relative rotation between the towed and the towing vehicles;

c. electric signal generating means mounted on the towing vehicle and responsive to the sensing means for generating an input command electric signal representative of the relative rotation;

d. means electrically coupling said motor means to said electric signal generating means for rotating a rear view mirror in response to said input command electrical signal; and e. mirror position feedback means operatively coupled to said rear view mirror and to said electric signal generating means for deriving a feedback signal representative of the actual rotational position of the rear view mirror and for supplying the same to said electric signal generating means for use in developing the input command electrical signal.

2. A device as defined in claim 1 wherein said sensing means is mounted on said towing vehicle at a point closely adjacent the pivotable connection between the towed and towing vehicles whereby it is made insensitive to relative movement between the two vehicles in the vertical direction.

3. A device as defined in claim 1 wherein said readily attached sensor element comprises a flexible member having one end readily attachable to the towed vehicle and the other end connected to actuate the sensing means on the towing vehicle.

4. A device as defined in claim 3 wherein the sensing means further includes a rotatable member that is mounted on the towing vehicle and rotatable relative to the towing vehicle, and the remaining end of the flexible member is connected to said rotatable member for turning it a given number of degrees in response to the relative rotation.

5. A device as defined in claim 4 further including first rotatable electric signal generating means comprising a part of said electric signal generating means and wherein said rotatable member drives said first rotatable electric signal generating means to produce the input command electric signal representative of the relative rotation.

6. A device as defined in claim 5 wherein said electric signal generating means further includes summing amplifier circuit means, second rotatable electric signal generating means mechanically coupled to and rotatable along with said electrically operated motor means for generating a mirror position feedback electric signal representative of the rotational position of the mirror, and means for supplying said mirror position feedback signal to the summing input of said summing amplifier circuit means along with the input command electric signal produced by the first rotatable electric signal generating means.

7. A device as defined in claim 6 wherein there are two mirrors provided for the right and left sides of the towing vehicle respectively, there being a respective mirror rotation system for each mirror including a respective mirror rotation motor means and summing amplifier circuit means, and said electric signal generating means further includes selector circuit means for selecting one of two rear view mirror rotation systems to which the input command electric signal is supplied.

8. A device as defined in claim 6 further including zero position adjustment means electrically connected to the summing input of the summing amplifier circuit means for adjusting the median position zero-output of the summing amplifier circuit means to compensate for variances in the vehicles being towed.

9. A device as defined in claim 6 further including variable input signal level adjusting means connected to the respective summing inputs of the summing amplifier circuit means for variably adjusting the relative values of the input command electric signal and the mirror position feedback signal to compensate for variances in the relative values of the signals due to differences in the characteristics of different vehicles being towed and the like.

10. A device as defined in claim 6 wherein the first rotatable electric signal generating means includes a dead band region straddling the median zero relative rotation position whereby the device is made insensitive to and prevents minimal mirror rotational position adjustments that otherwise might be produced during normal steering corrections occurring during straight-ahead driving conditions.

11. A device as defined in claim 6 wherein the electric signal generated is an analog signal whereby a continuous linear adjustment is attainable to thereby provide continuous linear adjustment of the degree of rotation of the mirror.

12. A device as defined in claim 11 wherein said first rotatable electric signal generating means comprises a first variable potentiometer connected to and rotatable along with said rotatable member, said second rotatable electric signal generating means comprises a second variable potentiometer connected to and rotatable along with said mirror rotating motor means, and both of said variable potentiometer means are electrically connected to the summing input of the summing amplifier circuit means with appropriate polarities whereby the output from the summing amplifier circuit means will be driven to zero upon the mirror being rotated to its proper position.

13. A device as defined in claim 12 further including zero position adjustment means electrically connected to the summing input of the summing amplifier circuit means for adjusting the median position zero output of the summing amplifier circuit means to compensate for variances in the vehicles being towed and variable input signal level adjusting means connected to the respective summing inputs of the summing amplifier circuit means for variably adjusting the relative values of the input command electric signal and the mirror position feedback signal to compensate for variances in the relative values of the signals due to differences in the characteristics of different vehicles being towed and the like.

14. A device as defined in claim 1 wherein the first rotatable electric signal generating means includes a dead band region straddling the median zero relative rotation position whereby the device is made insensitive to and prevents minimal mirror rotational position adjustments that otherwise might be produced during normal steering corrections occurring during straight-ahead driving conditions and wherein said sensing means is mounted on said towing vehicle at a point closely adjacent the pivotal connection between the towed and towing vehicles whereby it is made insensitive to relative movement between the two vehicles in the vertical direction.

15. A device as defined in claim 13 wherein there are two mirrors provided for the right and left sides of the towing vehicle respectively, there being a respective mirror rotation system for each mirror including a respective mirror rotation motor means and summing amplifier circuit means, and said electric signal generating means further includes selector circuit means for selecting one of two rear view mirror rotation systems to which the electric signal is supplied.

16. A device as defined in claim 15 wherein at least the right rear view mirror is positioned in front of the windshield whereby a line of sight from the driver's seat in the towing vehicle will pass through the windshield to the mirror and be reflected along the side of the towed vehicle in a manner to minimize the rotational movement of the driver's eyes away from oncoming traffic while viewing the right mirror.

* * * * *